United States Patent
Zhou et al.

(10) Patent No.: US 12,460,364 B2
(45) Date of Patent: Nov. 4, 2025

(54) FLOW GUIDING SEDIMENT BYPASS TUNNEL GATE STRUCTURE WITH SELF-ADAPTIVE INLET ADJUSTMENT

(71) Applicant: Changjiang River Scientific Research Institute, Changjiang Water Resources Commission of the Ministry of Water Resources, Hubei (CN)

(72) Inventors: Yinjun Zhou, Hubei (CN); Junfeng Han, Hubei (CN); Zhongwu Jin, Hubei (CN); Xiaobin Liu, Hubei (CN); Jiasheng Wang, Hubei (CN); Zhijing Li, Hubei (CN); Yiwu Chen, Hubei (CN); Yuqin Zhang, Hubei (CN); Chao Guo, Hubei (CN); Shuai Zhu, Hubei (CN); Xiuqin Ma, Hubei (CN); Meng Tong, Hubei (CN); Junxiao Ma, Hubei (CN)

(73) Assignee: CHANGJIANG RIVER SCIENTIFIC RESEARCH INSTITUTE, CHANGJIANG WATER RESOURCES COMMISSION OF THE MINISTRY OF WATER RESOURCES, Hubei (CN)

( * ) Notice: Subject to any disclaimer, the term of this patent is extended or adjusted under 35 U.S.C. 154(b) by 234 days.

(21) Appl. No.: 18/474,838

(22) Filed: Sep. 26, 2023

(65) Prior Publication Data
US 2025/0027287 A1     Jan. 23, 2025

(30) Foreign Application Priority Data
Jul. 19, 2023    (CN) ........................ 202310888633.X (51) Int. Cl.
*E02B 7/20*      (2006.01)
*E02B 7/28*      (2006.01)
(Continued)

(52) U.S. Cl.
CPC ................ *E02B 7/205* (2013.01); *E02B 7/28* (2013.01); *E02B 8/02* (2013.01); *E02B 8/045* (2013.01)

(58) Field of Classification Search
CPC ... E02B 8/02; E02B 7/205; E02B 7/28; E02B 8/045; E02B 3/02; E02B 3/023
See application file for complete search history.

(56) References Cited

U.S. PATENT DOCUMENTS 8,292,542 B2 * 10/2012 Aughton ................... E02B 7/28
                                                                      405/87
8,602,686 B2 * 12/2013 Aughton ................... E02B 7/28
                                                                      405/87

FOREIGN PATENT DOCUMENTS

CN         116641348 A  *   8/2023  ............ E02B 8/026
JP         H09143961 A  *   6/1997
(Continued)

*Primary Examiner* — Amber R Anderson
*Assistant Examiner* — Stacy N Lawson
(74) *Attorney, Agent, or Firm* — MUNCY, GEISSLER, OLDS & LOWE, P.C.

(57) ABSTRACT

A gate structure of flow guiding sediment bypass tunnel with self-adaptive inlet adjustment the gate structure comprises a sediment bypass tunnel main body, wherein: the sediment bypass tunnel main body comprises a second revolution wheel, a second braking rim, a top water stopper plate and a weir, a second regulator is provided at a front side of the sediment discharge tunnel, the second revolution wheel is provided at a top portion of the second regulator, a top portion of the second revolution wheel is welded with the second valve lever, the second valve lever is connected with the top portion of the second regulator, and by providing the (Continued)

flow guiding structure at the bottom portion bottom water flows with higher sediment concentrations can be guided into the tunnel; and the altitude of the flow guiding inlet at the bottom portion can be automatically controlled with the gate structure.

7 Claims, 5 Drawing Sheets (51) Int. Cl.
  *E02B 8/02* (2006.01)
  *E02B 8/04* (2006.01)

(56) References Cited

FOREIGN PATENT DOCUMENTS

| KR | 20140047313 A | * | 4/2014 | ............... | E02B 7/36 |
| WO | WO-2006071010 A1 | * | 7/2006 | ............... | E02B 3/02 |

* cited by examiner

FLOW GUIDING SEDIMENT BYPASS TUNNEL GATE STRUCTURE WITH SELF-ADAPTIVE INLET ADJUSTMENT

TECHNICAL FIELD

The present invention relates to the technical field of hydraulic projects, specifically, a flow guiding sediment bypass tunnel gate structure with self-adaptive inlet adjustment.

BACKGROUND TECHNOLOGY

Sediment bypass tunnels are commonly used hydraulic structures, and are usually employed in rivers with rich sediments or in reservoirs with a smaller "reservoir-sediments ratio" (The ratio between the average annual incoming sediments and the volume of a reservoir. A bigger reservoir-sediments ratio means a high housing capacity of incoming sediments and a lower reservoir-sediments ratio means the reservoir is of high silt risk). The sediment bypass tunnels can be arranged underneath dams, and are configured for forward sediment discharging, the sediment bypass tunnels can also be provided at front sides or intermediate portions of the dams, so as to discharge the sediments in advance. To improve sediment discharge efficiency with sediment bypass tunnels and satisfy the sediment discharge demand to the largest extent is always a hot research point, wherein dimensions and configurations of gates of the sediment bypass tunnels are key. When the gates are too big, during flow few sediments and more water are discharged, which may result in big engineering work, a waste of water and reduced sediment discharge efficiency. There may be blockage by sediment when discharge capacity is not sufficient during the period of abundant water and sand when the gates are too small. Currently researches on the configurations of the gates of the sediment bypass tunnels are focused on flow safety under high water head pressure.

In cases where changes of incoming sediments are big, often a plurality of sediment bypass tunnels are provided at the dams for sediment transportation, and depending on the amount of incoming sediments and the height of water flow that contains a large number of sediments, different numbers of sediment bypass tunnels or sediment bypass tunnels in different positions are opened to realize proper sediment transportation. For sediment discharge at the front sides of the dams and in the intermediate portions of the reservoirs, due to limitations of space and engineering amount, usually only a single sediment bypass tunnel is provided. Its scheduling of the tunnel is relatively simple, that is, the tunnel is started when it is necessary to discharge sediments and closed when no sediment is to be discharged. There is not much consideration to such as whether a lot of water is used while few sediments are discharged or whether the opening of the gate corresponds to vertical positions of water flows that contain a lot of sediments, and there is a lack of fine and self-adaptive scheduling measures.

SUMMARY OF THE INVENTION

Targeting at the deficiency of the prior art, the present invention provides a flow guiding sediment bypass tunnel gate structure with self-adaptive inlet adjustment, which solves the problem that whether the opening degree of the traditional sediment bypass tunnel gate proposed in the background technology corresponds to the vertical position of the large sand content water flow is not considered much, and the lack of fine and adaptive scheduling measures.

To realize the foregoing purpose, the present invention provides the following technical solutions. A flow guiding sediment bypass tunnel gate structure with self-adaptive inlet adjustment, comprises the main body of the sediment bypass tunnel, wherein: the sediment bypass tunnel comprises a second revolution wheel, a second braking rim, a top water stopper plate and a weir, wherein a second regulator is provided at a front side of the sediment bypass tunnel, the second revolution wheel is provided on a top portion of the second regulator, a top portion of the second revolution wheel is welded with a second valve lever, the second valve lever is connected with a top portion of the second regulator, a bottom portion of the second valve lever is rotatably connected with a top portion of the second braking rim, the weir is provided at a side of the second regulator, lateral water stopper plates are provided at both sides of the weir, sides of top portions of the lateral water stopper plates are welded with both ends of the top water stopper plate, the top water stopper plate is provided on the weir, a first regulator is provided at a bottom portion of the weir, a first braking lever is connected with the first regulator, a controller is provided at a top portion of the first braking lever, a bottom portion of the first braking lever is connected rotatably with the first braking rim, and a drive device and a monitor system are provided in the controller.

Preferably, the bottom portion of the weir is lower than a bottom portion of the main body of the sediment bypass tunnel, and a side of the weir is step-shaped.

Preferably, an experiment method of the sediment bypass tunnel comprises the following steps:

Step one: configuring an open sediment bypass tunnel to be the main body of the sediment bypass tunnel with flow regulation at a bottom portion, guiding a water flow at the bottom portion with a high sediment content to flow into the sediment bypass tunnel. Providing a sediment bypass tunnel structure with flow regulation at the bottom portion, which the entrance of sediment bypass tunnel is composed of a guiding structure and a weir during sediment discharge at an intermediate portion of a reservoir;

Step two: obtaining calculation equations for vertical distribution features and a layering and inflection height of sediment contents under different sediment inflow conditions in weak force water flows of reservoirs. Conducting the flume test on the vertical distribution features of the sediments in weak force and fine particle water flows targeting at features of the reservoirs of weak water flow and fine sediment particles. The width of the flume is 20 cm, the height of the flume is 25 cm, and the length of the flume is 3.5 m. The slop at a bottom portion of the flume is variable, the biggest affordable flow rate 8 $m^3/h$, and the variable range of the step at the bottom portion of the flume is 0-1%;

Step three: considering a particle diameter of suspended sediments in common reservoirs (0.001 mm to 0.1 mm). A gradation of sand is used in tests, with a median particle size of 0.065 mm, during the tests, different combinations of inlet flow rate, sediment contents and water depths are considered. Sediment concentration along a vertical direction is measured at a hydrographic section according to a ten-point method, wherein measurement of the sediment contents is done at ten points dividing water along a water depth direction, and the sediment content showed obvious stratification at an upper layer and a lower layer;

Step four: configuring a flow guiding structure of the flow guiding sediment bypass tunnel to be an adjustable gate, openness of the adjustable gate is adjustable adaptively according to water flows and sediment inflows, thus the bottom height of the gate is just at the inflection point of the sediment concentration of the incoming flow, so as to reach precise and efficient sediment discharge effects.

Preferably, in the step three, based on basic theories of river mechanics, features of the sediment concentrations along the vertical direction and a depth of the layering, a depth of vertical delamination inflection point of fine sediment content $H_0$ are correlated to factors, namely, a flow rate v, a water depth h, the sediment concentrations s, and the median particle size D, and conventional parameters, namely, a volume weight of sediments γs, a volume weight of water γ and gravitational acceleration g, and a relationship is shown here:

$$H_0 = f(h, v, D, s, \gamma s, \gamma, g) \quad (1)$$

Preferably, to conduct data regression conveniently, the foregoing factors are to be non-dimensional-normalized, therefore a sediment incipient motion formula (2) and a sediment-carrying capacity formula (3) are given.

Preferably, the sediment incipient motion formula is:

$$v_c = \left(\frac{h}{D}\right)^{0.14} \sqrt{17.6D\frac{\gamma_s - \gamma}{\gamma} + 0.000000605\frac{10+h}{D^{0.72}}} \quad (2)$$

In the formula: vc is a competent velocity of the sediments.

Preferably, the sediment-carrying capacity formula (3) is:

$$S_m = K\left\{\frac{v^3}{gh\omega}\right\}^m \quad (3)$$

In the formula: $S_m$ is a sediment-carrying capacity, k and m are constants, for the reservoirs usually 0.25 and 0.92 are used, and ω is a sediment settling velocity, and is correlated with D.

Preferably, substituting the formula (3) into the formula (1) for non-dimensional normalization, and the following equation is obtained:

$$H_0/h = f(v/v_c, s/s_m) \quad (4)$$

Preferably, by conducting non-dimensional regression and least squares regression for data of the flow rate, the water depth, the sediment concentration and the inflection point depth, a formula of the inflection point depth of the sediment concentration (5) is obtained:

$$\frac{h}{H_0} = 44.39\left(\frac{v}{v_0}\right)^{-1.189}\left(\frac{s}{s_m}\right)^{-0.566} \quad (5)$$

Wherein a correlation coefficient is 0.89.

The present invention provides a gate structure of flow guiding sediment bypass tunnel with self-adaptive inlet adjustment. And the following beneficial effects are achieved:

For the gate structure of flow guiding sediment bypass tunnel with self-adaptive inlet adjustment, by mutual cooperation of each component, with the gate structure of flow guiding sediment bypass tunnel with inlet adjustment in accordance with sediments, targeting at differences of features of suspended sediments along the vertical direction at different sediment incoming conditions. On one aspect, bottom water flow with higher sediment concentrations is guided to flow into the tunnel by the flow guiding structure at the bottom portion so as to improve sediment discharge efficiency. On the other aspect, by controlling automatically the altitude of the flow guiding opening at the bottom portion with the gate structure, the gate structure is adaptive to the layering features of the sediment concentrations of the water flow, so as to reach the purpose of self-adaptive changes according to incoming sediments and precise and efficient sediment discharge is realized, in this way, problems that not sufficient attention has been paid to the fact whether the openness of the gate structure of conventional sediment bypass tunnels corresponds to the vertical positions of water flows with higher sediment concentrations and a lack of precise and self-adaptive control measures is present are solved.

In the drawings: 1 sediment bypass tunnel; 2 second regulator; 3 second revolution wheel; 4 second valve lever; 5 second braking rim; 6 lateral water stopper plate; 7 top water stopper plate; 8 weir; 9 first regulator; 10 first braking rim; 11 first valve lever; and 12 controller.

EMBODIMENTS

Hereinafter a complete and clear description will be given to the technical solutions of embodiments of the present invention in conjunction with the drawings of the embodiments of the present invention; apparently, the embodiments given here are only some of the embodiments of the present invention rather than all. Based on the embodiments described in the present invention, all other embodiments obtained by those of ordinary skill without paying creative effort shall fall into the protection scope of the present invention.

Embodiment 1

Figure 1:
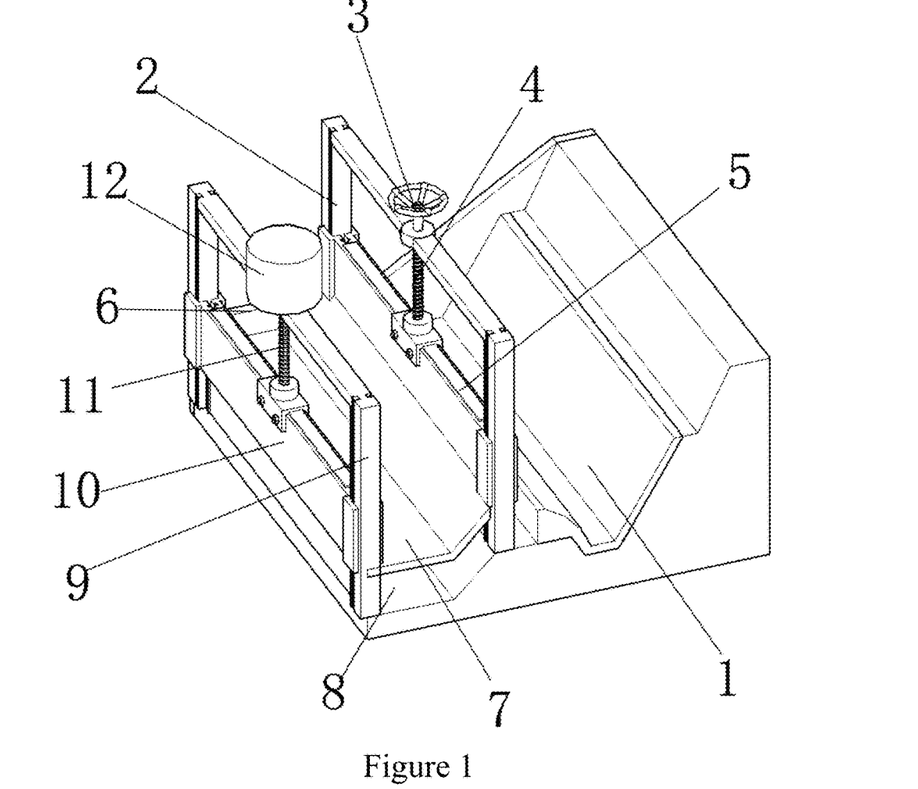
FIG. 1 is a cross section diagram showing the present invention.
Figure 2:
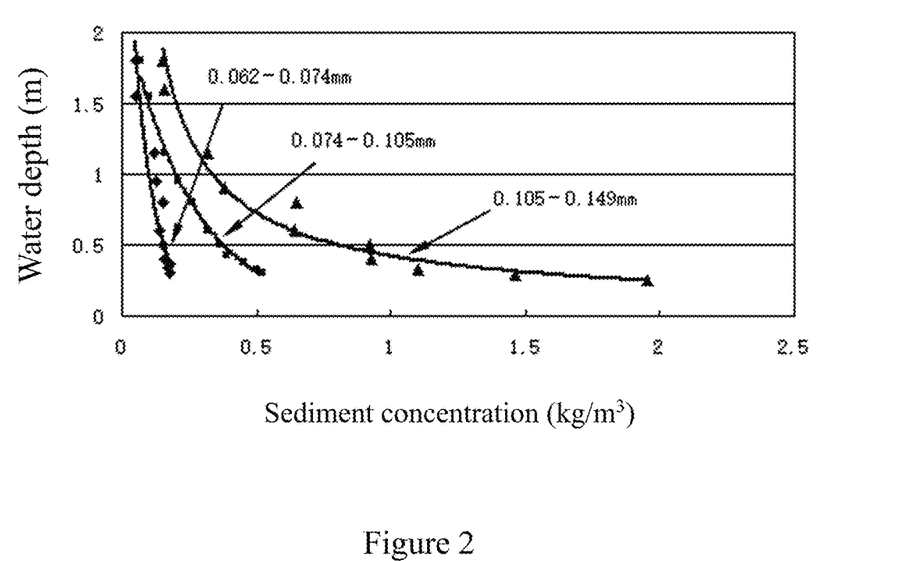
FIG. 2 is a diagram showing vertical distribution of suspended sediments in natural rivers.

A gate structure of a flow guiding sediment bypass tunnel with self-adaptive inlet adjustment, comprises a sediment bypass tunnel main body 1, wherein: the sediment bypass tunnel main body 1 comprises a second revolution wheel 3, a second braking rim 5, a top water stopper plate 7 and a weir 8, wherein a second regulator 2 is provided at a front side of the sediment bypass tunnel 1, the second revolution wheel 3 is provided at a top portion of the second regulator 2, a top portion of the second revolution wheel 3 is welded with a second valve lever 4, the second valve lever 4 is connected with a top portion of the second regulator 2, a bottom portion of the second valve lever 4 is connected rotatably with a top portion of the second braking rim 5, the weir 8 is provided at a side of the second regulator 2, lateral water stopper plates 6 are provided at both sides of the weir 8, sides of top portions of the lateral water stopper plates 6 are welded with both ends of the top water stopper plate 7, the top water stopper plate 7 is provided above the weir 8, a first regulator 9 is provided at a bottom portion of the weir 8, the first regulator 9 is connected with a first valve lever 11, a controller 12 is connected at a top portion of the first valve lever 11, a bottom portion of the first valve lever 11 is connected rotatably with the first braking rim 10 and a drive device and a monitor system are provided in the controller 12.

The bottom portion of the weir 8 is lower than a bottom portion of the sediment bypass tunnel 1, and a side of the weir 8 is step-shaped.

Figure 3:
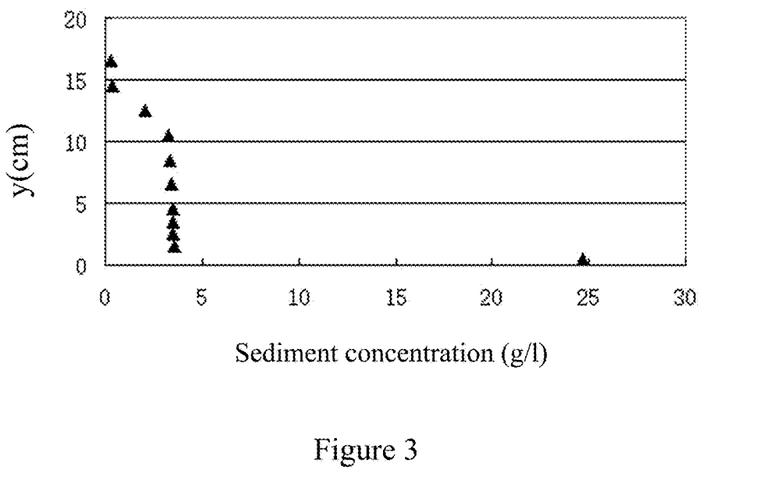
FIG. 3 is a diagram showing vertical distribution of sediment concentrations.
Figure 4:
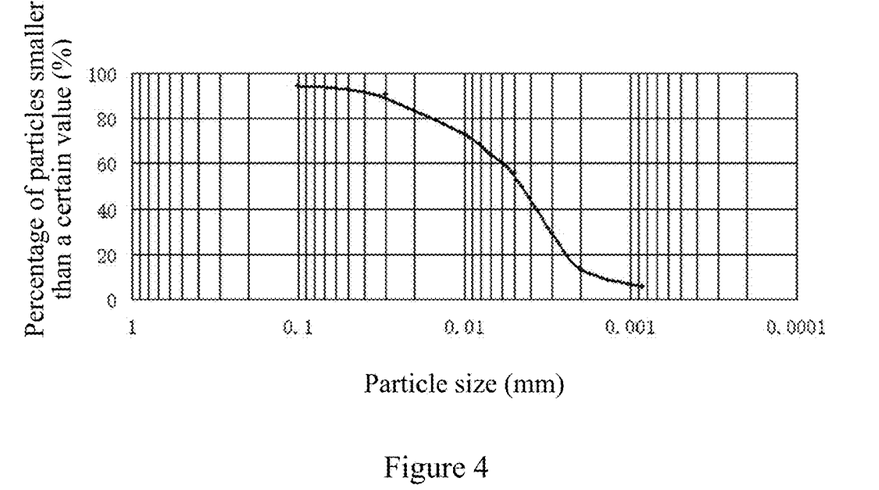
FIG. 4 is a diagram showing a gradation of sediments.
Figure 5:
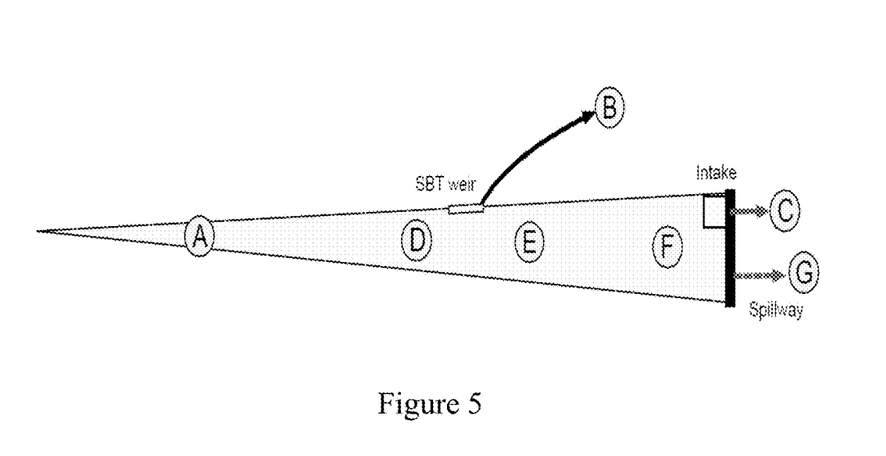
FIG. 5 is a diagram showing sediment discharge at intermediate portions of a reservoir.
Figure 6A:
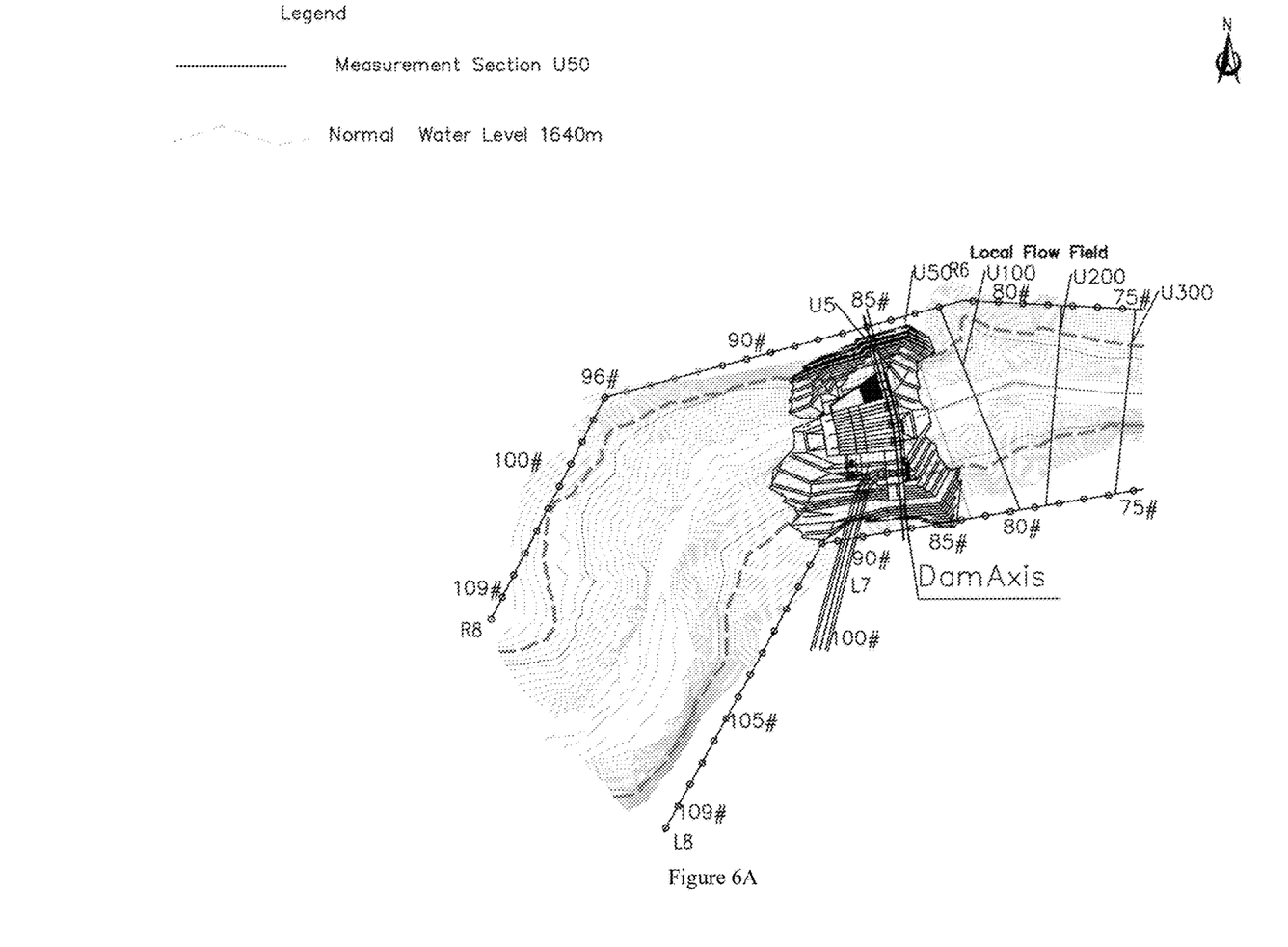
FIGS. 6A-6C are plan views of the reservoir.
Figure 6B:
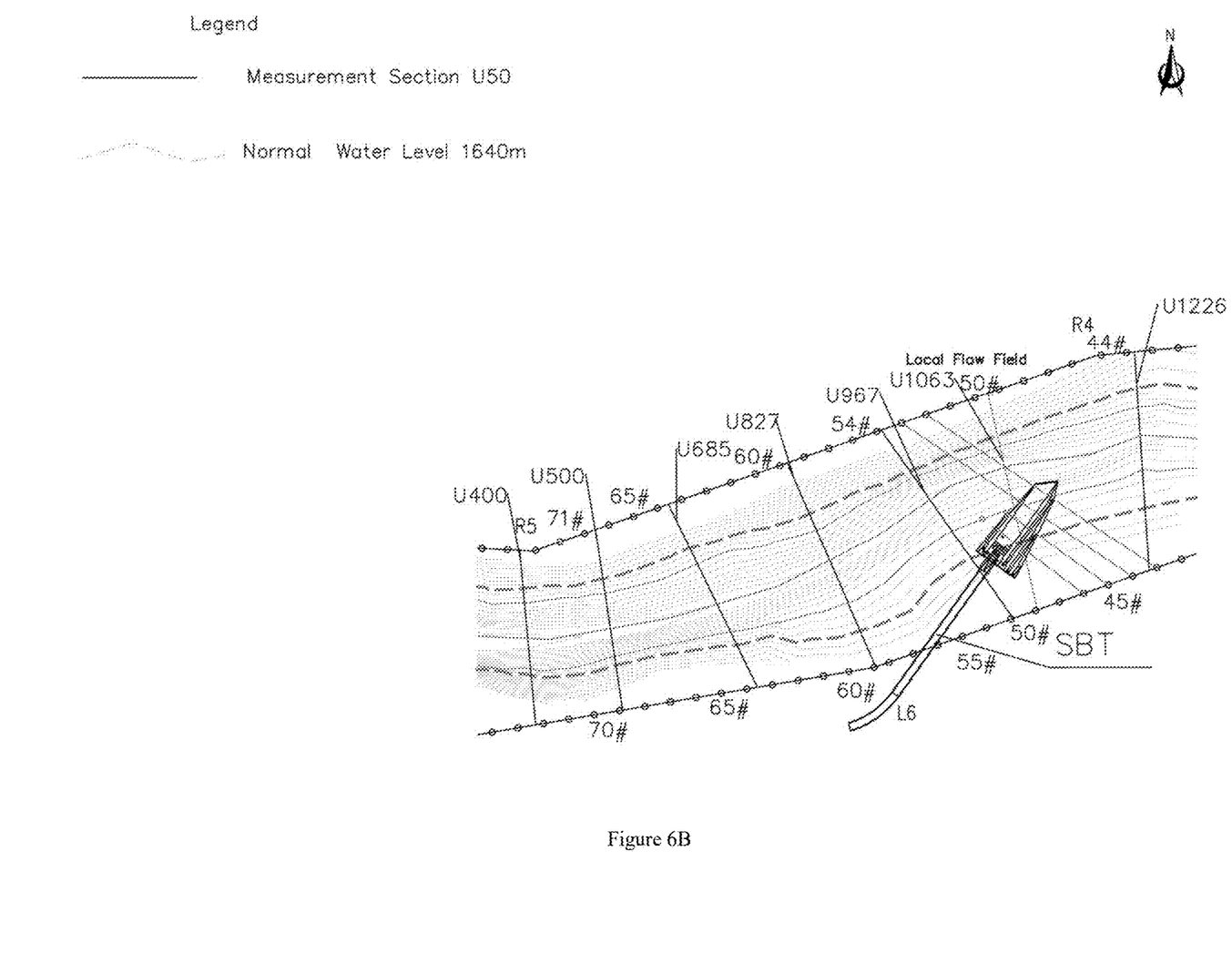
Figure 6C:
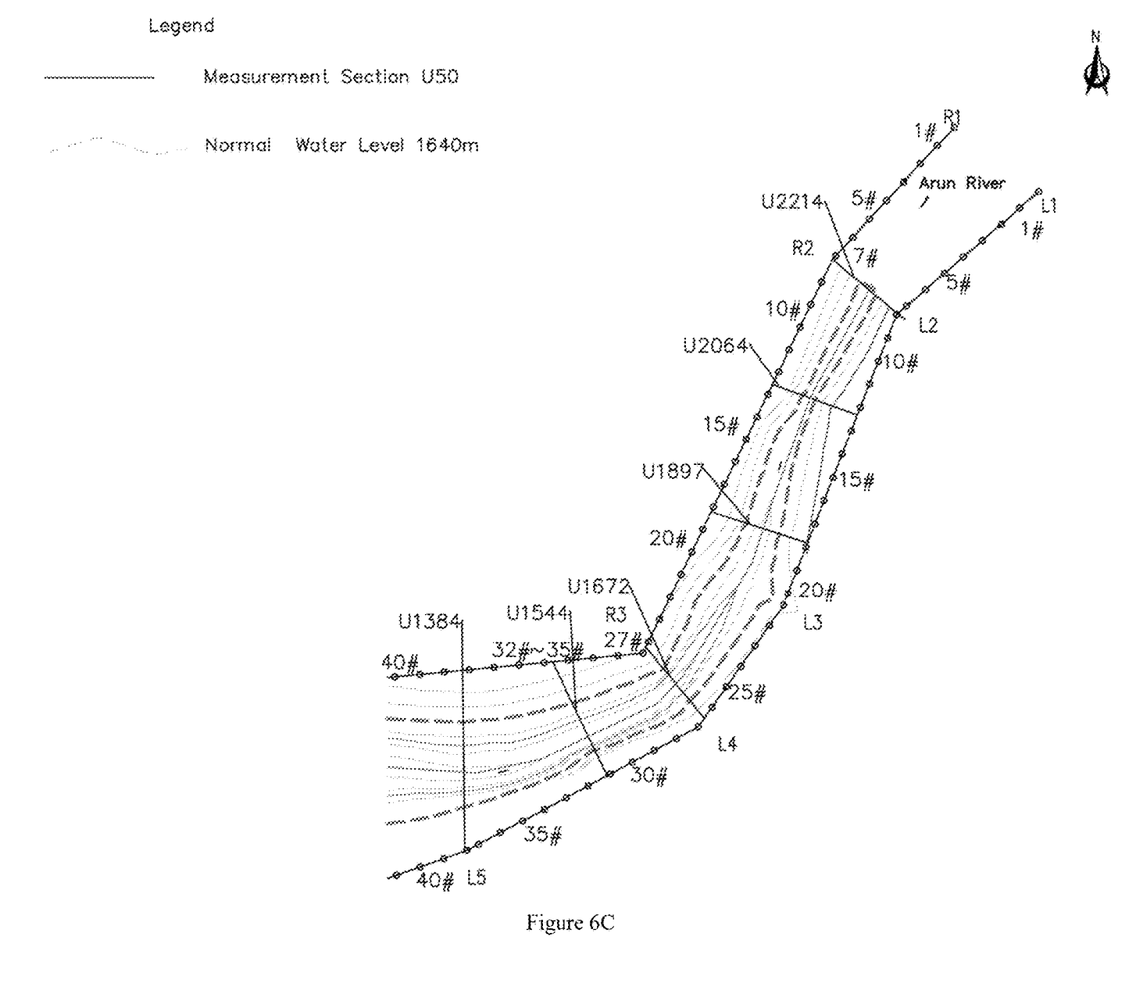

A water depth $H_0$ corresponding to an inflection point of vertical distribution of sediment concentration is to be obtained by calibration with special flume test and simulation, and an experiment method of the sediment bypass tunnel comprises the following steps:

Step one: configuring common open sediment bypass tunnel to be the sediment bypass tunnel main body 1 with a flow guiding structure at a bottom portion, guiding water flows with higher sediment concentrations to flow into the sediment bypass tunnel main body 1, during sediment discharging at intermediate portions of a reservoir, providing the sediment bypass tunnel with the flow guiding structure at the bottom portion, wherein an inlet of the sediment bypass tunnel comprises a guiding structure and a cofferdam;

Step two: researching to obtain calculation formulas of vertical distribution features of sediment concentrations and heights of layering and inflection points under different sediment incoming conditions in weak force water flows in a reservoir, conducting flume tests for concluding the vertical distribution features of sediment concentrations of weak force fine particle sediments, wherein the width of the flume is 20 cm, the height thereof 25 cm, the length thereof 3.5 m, the step at a bottom portion of the flume is variable, with a biggest affordable flow rate 8 m³/h, and a change range of the slope at the bottom portion of the flume is 0-1%;

Step three: considering a range of particle sizes of suspended sediments in common reservoirs (0.001 mm to 0.1 mm), tests were done with a gradation of sands, with a median particle size of 0.065 mm, experiment conditions were set considering different combinations of inlet flow rates, sediment concentrations and water depths, vertical distribution measurement of sediment concentrations was done at hydrographic sections by a ten-point method, wherein measurement of the sediment contents is done at ten points dividing water along a water depth direction, apparent vertical layering phenomena of the sediment concentrations were observed, as shown in FIG. 3, wherein an arrow therein shows where the inflection point is located, and from FIG. 3 the water depth $H_0$ of the layering "inflection point" of the sediment concentrations can be obtained;

Step four: configuring the flow guiding structure of the flow guiding sediment bypass tunnel to be an adjustable gate, and openness of the gate can be adaptively changed according to sediment incoming conditions, so that the height of the bottom portion of the gate is located at exactly the layering and inflection point of sediment concentrations of the incoming flow, so that precise and efficient sediment discharge effects can be realized.

In the step three, according to basic theories of river mechanics, vertical distribution features of sediment concentrations, that is, a layering and inflection depth $H_0$ of vertical distribution of sediment concentration of fine particle sediments is correlated with factors such as inflowing rate v, water depth h, sediment concentrations s and median particle size D and conventional parameters, volume weight of sediments γs, volume weight of water γ and gravitational acceleration g, that is:

$$H_0 = f(h, v, D, s, \gamma s, \gamma, g) \quad (1)$$

To make it easy to conduct data regression, non-dimensional normalization is to be done for the foregoing factors, therefore, a sediment incipient motion formula (2) and a sediment-carrying capacity formula (3) were introduced.

Wherein the sediment incipient motion formula (2) is:

$$v_c = \left(\frac{h}{D}\right)^{0.14} \sqrt{17.6D\frac{\gamma_s - \gamma}{\gamma} + 0.000000605\frac{10 + h}{D^{0.72}}} \quad (2)$$

In the formula: vc is a sediment incipient motion flow rate.

Wherein the sediment-carrying capacity formula (3) is:

$$S_m = K\left\{\frac{v^3}{gh\omega}\right\}^m \quad (3)$$

In the formula: $s_m$ is the sediment-carrying capacity, k and m are constants, usually 0.25 and 0.92 are used for reservoirs, and ω is a sediment settling velocity and is correlated with D.

Substituting the formula (3) into the formula (1) to conduct non-dimensional normalization, the following equation can be obtained:

$$H_0/h = f(v/v_c, s/s_m) \quad (4)$$

By non-dimensional normalization and conducting least squares regression of the flow rate, water depth, sediment concentrations and inflection point depth data obtained in the tests, the formula of the inflection depth of the sediment concentration (5) is obtained:

$$\frac{h}{H_0} = 44.39\left(\frac{v}{v_0}\right)^{-1.189}\left(\frac{s}{s_m}\right)^{-0.566} \quad (5)$$

Wherein the correlation coefficient is 0.89.

Embodiment 2

Upper Arun hydroelectric plant lies on the upper reach of the Arun river, which is a trans-boundary river and is part of the Kosi or Sapt Koshi river system in Eastern Nepal, with a linear distance to Kathmandu approximately 220 km.

Over the years average flow rate of the Arun river is 217 m³/s, an average annual runoff is 6,860,000,000 m³, and average annual incoming sediments for the river system before the location of the dam in many years is 16,240,000 t, wherein annual suspended sediment transportation 13,810,000 t, sediment load 2,430,000 t, average annual suspended sediment concentration over the years is 2.01 kg/m³, and a median particle diameter of the suspended sediments is 0.057 mm. The hydraulic head of power generation by diverting water is bigger than 500 m, the volume of the water dam is around 5,070,000 m³, the reservoir-sediment ratio is around 0.4, therefore, the Arun river is characterized in being "of high hydraulic head, small dam volume, big sediment contents and high sediment hardness".

To control sediment deposition, sediment bypass tunnels were provided, and inlets of the sediment bypass tunnels were provided at the left bank at 1 km upper stream from the dam, pressure tunnels were used, and the altitude of the bottom plates of the water inlets was 1610 m. When the reservoir level was 1625 m, the maximum discharge capacity of the sediment bypass tunnels were 822 m³/s.

The normal model 1:50 was used to simulate the sediment discharge effects of the reservoir. In the model, 1050 m³/s, 750 m³/s, 500 m³/s and 350 m³/s were used as the inflowing rate, the movable-bed test was conducted, during test, sediment concentration sampling was done at respectively an inlet A of the model (distance to the dam 1.67 km), an SBT outlet B (distance to the dam 1.2 km), an outlet C of the hydroelectric plant (distance from the dam 0 km), SBT upper stream D (distance to the dam 1.38 km), SBT lower stream E (distance to the dam 0.96 km), in front of the dam F (distance to the dam 0.1 km) and a bottom hole G (distance to the dam 0 km), drying the sediments and the sediment concentrations were tested to compare the sediment discharge effects with and without the guiding structure.

Comparing the SBT with the guiding structure with the SBT without the guiding structure, with the increase of the incoming flow, different extents of increase were observed in the SBT sediment concentrations (increases of the SBT sediment concentrations are respectively 9%, 4% and 2%), different extents of reduction were observed in sediment concentrations passing the turbines; and with the increase of the incoming flow, the changing magnitudes of the sediment concentrations of both the SBT and the hydroelectric plant were reduced.

With respect to the sediment discharge efficiency, comparing the SBT with the guiding structure with the SBT without the guiding structure, the sediment discharge efficiency was somehow improved, especially in big water flow big sediments conditions (1050 m³/s), and the sediment discharge efficiency for fine particle sediments was apparently improved, and for sediments smaller than 0.0062 mm the efficiency was improved from around 62% to around 78%; for small and medium water flow conditions, the improvement fell in between 3% to 8%, as big water flow and big sediments conditions had more layered flows. It can be seen that, with the guiding structure the sediment concentrations in the sediment bypass tunnels can be improved, sediment separation effects can be enhanced and they are especially suitable for use in big water flow and big sediments conditions with compelling sediment discharge demand.

Sediment discharge efficiency at different working conditions comparison table

| Incoming flow rate (m³/s) | Working condition | Particle size (mm) | SBT | Power plant | Total |
|---|---|---|---|---|---|
| 350 | With the guiding structure | 0.5~1 | | | 0 |
| | | 0.25~0.5 | 1.47 | 0.02 | 1.50 |
| | | 0.125~0.25 | 7.37 | 5.65 | 13.02 |
| | | 0.062~0.125 | 12.30 | 18.93 | 31.23 |
| | | 0.03~0.062 | 16.61 | 31.34 | 47.95 |
| | | 0.01~0.03 | 18.92 | 39.01 | 57.93 |
| | | 0.01~0.001 | 20.70 | 45.52 | 66.22 |
| | With no guiding structure | 0.5~1 | | | 0.00 |
| | | 0.25~0.5 | 7.27 | 2.60 | 9.87 |
| | | 0.125~0.25 | 7.54 | 11.49 | 19.03 |
| | | 0.062~0.125 | 11.51 | 30.36 | 41.87 |
| | | 0.03~0.062 | 13.88 | 44.96 | 58.84 |
| | | 0.01~0.03 | 14.87 | 50.73 | 65.60 |
| | | 0.01~0.001 | 15.90 | 55.37 | 71.26 |
| 500 | With the guiding structure | 0.5~1 | | | 0.00 |
| | | 0.25~0.5 | 30.79 | 2.20 | 32.99 |
| | | 0.125~0.25 | 40.42 | 5.98 | 46.40 |
| | | 0.062~0.125 | 48.22 | 13.88 | 62.11 |
| | | 0.03~0.062 | 51.43 | 21.08 | 72.51 |
| | | 0.01~0.03 | 51.92 | 23.41 | 75.34 |
| | | 0.01~0.001 | 51.79 | 26.53 | 78.32 |
| | With no guiding structure | 0.5~1 | | | 0.00 |
| | | 0.25~0.5 | 23.68 | 3.18 | 26.85 |
| | | 0.125~0.25 | 35.05 | 7.92 | 42.97 |
| | | 0.062~0.125 | 44.81 | 15.89 | 60.69 |
| | | 0.03~0.062 | 48.15 | 21.91 | 70.06 |
| | | 0.01~0.03 | 49.11 | 24.02 | 73.13 |
| | | 0.01~0.001 | 49.35 | 25.87 | 75.22 |
| 750 | With the guiding structure | 0.5~1 | 15.21 | | 15.21 |
| | | 0.25~0.5 | 40.41 | 3.92 | 44.33 |
| | | 0.125~0.25 | 52.23 | 10.79 | 63.02 |
| | | 0.062~0.125 | 60.60 | 19.51 | 80.11 |
| | | 0.03~0.062 | 64.12 | 23.04 | 87.16 |
| | | 0.01~0.03 | 63.25 | 24.06 | 87.31 |
| | | 0.01~0.001 | 60.34 | 24.84 | 85.19 |
| 350 | With the guiding structure | 0.5~1 | | | 0 |
| | | 0.25~0.5 | 1.47 | 0.02 | 1.50 |
| | | 0.125~0.25 | 7.37 | 5.65 | 13.02 |
| | | 0.062~0.125 | 12.30 | 18.93 | 31.23 |
| | | 0.03~0.062 | 16.61 | 31.34 | 47.95 |
| | | 0.01~0.03 | 18.92 | 39.01 | 57.93 |
| | | 0.01~0.001 | 20.70 | 45.52 | 66.22 |
| | With no guiding structure | 0.5~1 | | | 0.00 |
| | | 0.25~0.5 | 7.27 | 2.60 | 9.87 |
| | | 0.125~0.25 | 7.54 | 11.49 | 19.03 |
| | | 0.062~0.125 | 11.51 | 30.36 | 41.87 |
| | | 0.03~0.062 | 13.88 | 44.96 | 58.84 |
| | | 0.01~0.03 | 14.87 | 50.73 | 65.60 |
| | | 0.01~0.001 | 15.90 | 55.37 | 71.26 |
| | With no guiding structure | 0.5~1 | 0.00 | 2.61 | 2.61 |
| | | 0.25~0.5 | 39.93 | 10.10 | 50.03 |
| | | 0.125~0.25 | 63.47 | 17.09 | 80.56 |
| | | 0.062~0.125 | 57.20 | 21.15 | 78.35 |
| | | 0.03~0.062 | 56.34 | 22.15 | 78.49 |
| | | 0.01~0.03 | 56.76 | 22.55 | 79.31 |
| | | 0.01~0.001 | 58.48 | 23.19 | 81.67 |
| 1050 | With the guiding structure | 0.5~1 | | | 0.00 |
| | | 0.25~0.5 | 13.44 | 2.30 | 15.74 |
| | | 0.125~0.25 | 37.40 | 9.08 | 46.49 |
| | | 0.062~0.125 | 57.19 | 14.79 | 71.99 |
| | | 0.03~0.062 | 74.20 | 18.85 | 93.05 |
| | | 0.01~0.03 | 85.82 | 20.56 | 106.37 |
| | | 0.01~0.001 | 74.82 | 18.11 | 92.93 |
| | With no guiding structure | 0.5~1 | | | 0.00 |
| | | 0.25~0.5 | 66.29 | 4.47 | 70.76 |
| | | 0.125~0.25 | 63.92 | 11.12 | 75.04 |
| | | 0.062~0.125 | 63.10 | 17.00 | 80.10 |
| | | 0.03~0.062 | 62.65 | 18.89 | 81.54 |
| | | 0.01~0.03 | 62.23 | 18.33 | 80.56 |
| | | 0.01~0.001 | 61.72 | 19.77 | 81.49 |

Working principles: the lateral water stopper plates 6 and the top water stopper plate 7 are configured to prevent water from entering the sediment bypass tunnel main body 1 from a top portion and sides of the first regulator 9; by measuring the water height and the sediment concentrations with the monitor system in the controller 12, and sending signals to the drive system by the controller, the drive device can control the first valve lever 11 to rotate, so as to adjust openness of the first regulator 9 autonomously according to water flows and sediment concentrations, by guiding the bottom water flows with higher sediment concentrations from the reservoir to the first regulator 9 then to the weir 8, the weir 8 guides the water flow from the bottom portion of the second regulator 2 to enter the sediment bypass tunnel main body 1 against the stream, and by driving the second braking rim 5 to make vertical movements, the weir 8 can be opened or closed.

The 1 sediment bypass tunnel; 2 second regulator; 3 second revolution wheel; 4 second valve lever; 5 second braking rim; 6 lateral water stopper plate; 7 top water stopper plate; 8 weir; 9 first regulator; 10 first braking rim; 11 first valve lever and 12 controller are standard parts or parts that those skilled in the art know, and the structures and principles thereof can be obtained from technical books or conventional experiment methods.

In the foregoing paragraphs the basic principles, primary characteristics and advantages of the present invention are set forth and described, for those skilled in the art, apparently, the present invention is not limited to the details disclosed in the exemplary embodiment, and without departing from the spirit and basic features of the present invention, the present invention can be carried out in other specific forms. Therefore, no matter viewing from any point, the embodiments shall be construed as exemplary and non-restrictive, the scope of the present invention is defined by the appended claims rather than the foregoing description; therefore, all changes that are covered by meanings and ranges of equivalent parts of the claims are covered in the present invention. The drawing marks appeared in the claims shall not be understood to limit the corresponding claims.

Furthermore, it shall be understood that, although the present invention are described as per embodiments, no every embodiment comprises only a single technical solution, the narration of the description is only for the sake of clarity, those skill in the art shall take the description as an entirety, the technical solutions in the embodiments can be appropriately combined to form other embodiments that those skilled in the art can understand.

The invention claimed is:

1. A flow guiding sediment bypass tunnel gate structure with self-adaptive inlet adjustment, the flow guiding sediment bypass tunnel gate structure comprising:
   a sediment bypass tunnel main body;
   a revolution wheel;
   a first gate and a second gate;
   a top water stopper plate; and
   a weir;
   wherein the second regulator is provided at a front side of the sediment bypass tunnel main body, the revolution wheel is provided on a top portion of the second regulator, a top portion of the revolution wheel is welded with a second gate rotatable rod, the second gate rotatable rod is connected with a top portion of the second regulator, a bottom portion of the second gate rotatable rod is rotatably connected with a top portion of the second gate, the weir is provided at a side of the second regulator, lateral water stopper plates are provided at both sides of the weir, sides of top portions of the lateral water stopper plates are welded with both ends of the top water stopper plate, the top water stopper plate is provided on the weir, the first regulator is provided at a bottom portion of the weir, a first gate rotatable rod is connected with the first regulator, a controller is provided at a top portion of the first gate rotatable rod, a bottom portion of the first gate rotatable rod is connected rotatably with the first gate, and a drive device and a monitor system are provided in the controller.

2. The flow guiding sediment bypass tunnel gate structure with self-adaptive inlet adjustment according to claim 1, wherein an experiment method of a sediment bypass tunnel comprises the following steps:
   step one: configuring an open sediment bypass tunnel to be the sediment bypass tunnel with flow regulation at a bottom portion, guiding a water flow at the bottom portion with a high sediment content to flow into the sediment bypass tunnel, during sediment discharge at an intermediate portion of a reservoir, providing the sediment bypass tunnel with flow regulation at the bottom portion, wherein an intake of the sediment bypass tunnel comprises a guiding structure and the weir;
   step two: obtaining calculation equations for vertical distribution features and a layering and inflection height of sediment contents under different sediment inflow conditions in weak force water flows of reservoirs, targeting at features of the reservoirs of weak water flow and fine sediment particles, conducting at least one flume test for the vertical distribution features of the sediments in weak force and fine particle water flows, wherein a width of the flume is 20 cm, a height of the flume is 25 cm, and a length of the flume is 3.5 m, a step at a bottom portion of the flume is variable, a biggest affordable flow rate 8 m$^3$/h, and a variable range of the step at the bottom portion of the flume is 0-1%;
   step three: testing with a gradation of sand including a particle diameter of 0.001 mm to 0.1 mm and a median particle size of 0.065 mm, the testing including considering different combinations of inlet flow rate, sediment contents and water depths, and measuring sediment concentration along a vertical direction at a hydrographic section according to a ten-point method, wherein the ten-point method includes measuring the sediment contents at ten points dividing water along a water depth direction, and determining a point where the sediment contents show obvious stratification between an upper layer and a lower layer;
   step four: configuring the guiding structure of the guiding sediment bypass tunnel to be the first gate, wherein openness of the first gate is adjustable adaptively according to water flows and sediment inflows, thus a height of a bottom portion of the first gate is located at a layering and inflection point of sediment concentrations in the water flows, thereby improving sediment discharge effects.

3. The flow guiding sediment bypass tunnel gate structure with self-adaptive inlet adjustment according to claim 2, wherein in the step three, a depth of the layering and inflection point of the sediment concentrations along the vertical direction of fine particles sediments $H_0$ correlates to factors, namely, a flow rate v, a water depth h, the sediment concentrations s and the median particle size D, and conventional parameters, namely, a volume weight of sediments γs, a volume weight of water γ and gravitational acceleration g, and a relationship is shown here:

$$H_0 = f(h, v, D, s, \gamma s, \gamma, g). \tag{1}$$

4. The flow guiding sediment bypass tunnel gate structure with self-adaptive inlet adjustment according to claim 3, wherein the experiment method further comprises combining a sediment incipient motion formula and a sediment-carrying capacity formula with the formula (1) for non-dimensional-normalization.

5. The flow guiding sediment bypass tunnel gate structure with self-adaptive inlet adjustment according to claim 4, wherein the sediment incipient motion formula is:

$$v_c = \left(\frac{h}{D}\right)^{0.14} \sqrt{17.6D\frac{\gamma_s - \gamma}{\gamma} + 0.000000605\frac{10+h}{D^{0.72}}} \tag{2}$$

in the formula: Ve is a competent velocity of the sediments.

6. The flow guiding sediment bypass tunnel gate structure with self-adaptive inlet adjustment according to claim 4, wherein the sediment-carrying capacity formula (3) is:

$$S_m = K\left\{\frac{v^3}{gh\omega}\right\}^m \tag{3}$$

in the formula: $S_m$ is a sediment-carrying capacity, K and m are constants of 0.25 and 0.92 respectively, and ω is a sediment settling velocity, and is correlated with D.

7. The flow guiding sediment bypass tunnel gate structure with self-adaptive inlet adjustment according to claim 6, wherein substituting the formula (3) into the formula (1) for non-dimensional normalization, and the following equation is obtained:

$$H_0/h = f(v/v_c, s/s_m). \tag{4}$$

* * * * *